UNITED STATES PATENT OFFICE.

FRITZ HABER, OF BERLIN, AND CARL BOSCH AND ALWIN MITTASCH, OF LUDWIGS-HAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PRODUCING AMMONIA.

1,149,510.   Specification of Letters Patent.   Patented Aug. 10, 1915.

No Drawing.   Application filed January 30, 1912.   Serial No. 674,423.

*To all whom it may concern:*

Be it known that we, FRITZ HABER, CARL BOSCH, and ALWIN MITTASCH, subjects the first two of the King of Prussia and the latter of the King of Saxony, residing the first at Berlin and the others at Ludwigshafen-on-the-Rhine, Germany, have invented new and useful Improvements in Producing Ammonia, of which the following is a specification.

In the specification of French Patent No. 430,595 it is stated that small quantities of ammonia can be prepared synthetically by passing a mixture of nitrogen and hydrogen over a catalytic agent consisting of zinc, and it is also suggested that, instead of zinc, tungsten can, less advantageously, be employed for the same purpose, as a higher temperature is maintained.

We have discovered that ammonia can be prepared using tungsten as a catalytic agent, provided a special new form of tungsten be employed, and that, in this case, yields of ammonia can be obtained which are far greater than those which can be produced when employing zinc or tungsten, as usually prepared, for the catalytic combination. The tungsten for use as a catalytic agent according to our invention is produced as described in the specification of application for patent Serial No. 677,412, that is to say, from pure compounds such as the oxids, halogen compounds, or ammonium tungstate, by reduction at a moderate temperature with hydrogen or ammonia. When employing hydrogen for the reduction, pressure should preferably be employed and the temperature should not exceed 600° C., while, with ammonia, the use of a temperature of about 800° C. appears to result quickly in the production of a tungsten which gives practically as good yields as does that produced with hydrogen or ammonia at about 600° C. If desired, tungstic acid, ammonium tungstate, and the like can be reduced directly in the contact tube by means of the mixture of nitrogen and hydrogen, provided the above-named temperature of 600° C. be not considerably exceeded and the catalytic production of ammonia can be immediately proceeded with. If desired, the tungsten can be precipitated or placed on carriers, such for instance as silica and asbestos.

In this application we wish to be understood as including under the term "tungsten" also a compound, such as a nitrid or amid-nitrid, thereof, which is also capable of exerting the required catalytic power, since it is difficult to ascertain when working whether the tungsten remains as metallic tungsten, or whether and to what degree it may be converted into such nitrid or similar compound.

Suitable temperatures for producing ammonia according to this invention lie between about 400° and 700° C.

The following examples will serve to illustrate further the nature of our invention, which, however, is not confined to these examples:

Example 1: Heat ammonium tungstate which is free from fixed alkali or tungsten oxychlorid, in an atmosphere of ammonia, rapidly, to 800° C., and then place the mass obtained in the contact tube and employ it for the production of ammonia at 600° C., while employing a pressure of about 150 atmospheres.

Example 2: Fill pure tungstic acid into a contact tube and pass a pure mixture of 3 parts of hydrogen and 1 part of nitrogen over it at a temperature of from 550° to 600° C., and at a pressure of 150 atmospheres. The tungstic acid is first of all reduced to metallic tungsten or to a tungsten-nitrogen compound, whereupon the formation of ammonia immediately commences and continues. Any tungsten-nitrogen compound obtained by reduction with a gas containing nitrogen can be converted into the metal by dissociation *in vacuo*.

Example 3: Pass a current of hydrogen at a pressure of 80 atmospheres over pure tungstic acid at a temperature of from 550° to 600° C. The reduction takes place very rapidly. Then place the mass in the contact tube and pass a current of nitrogen and hydrogen in combining proportions over it at 600° C. while employing pressure.

Now what we claim is:—

1. The process of producing ammonia, by reducing a tungsten compound with a gas containing hydrogen at a moderate temperature so as to obtain a tungsten which possesses at least one hundred times the catalytic power of zinc and then passing a current of nitrogen and hydrogen at a temperature of from about 550° to about 600° C., substantially as hereinbefore described.

2. The process of producing ammonia, by reducing a tungsten compound with a gas containing hydrogen at a moderate temperature so as to obtain a tungsten which possesses at least one hundred times the catalytic power of zinc and then passing a current of nitrogen and hydrogen under pressure over such tungsten at a temperature of from about 550° to about 600° C., substantially as hereinbefore described.

3. The process of producing ammonia by passing a current of nitrogen and hydrogen under pressure over a catalytic agent containing tungsten and possessing at least one hundred times the catalytic power of zinc while employing a temperature of from about 550° to about 600° C.

4. The process of producing ammonia by reducing an oxy-compound of tungsten with hydrogen at a temperature not considerably exceeding 600° C., and then passing a current of nitrogen and hydrogen under pressure over the tungsten thus obtained while employing a temperature of from about 550° to about 600° C.

5. The process of producing ammonia by reducing an oxy-compound of tungsten with hydrogen under pressure at a temperature not considerably exceeding 600° C., and then passing a current of nitrogen and hydrogen under pressure over the tungsten thus produced while employing a temperature of from about 550° to about 600° C.

In testimony whereof we have hereunto set our hands in the presence of two subscribing witnesses.

Dr. FRITZ HABER.
CARL BOSCH.
ALWIN MITTASCH.

Witnesses to signature 1:
   Woldemar Haupt,
   Henry Hasper.
Witnesses to signatures 2 and 3:
   A. O. Tittmann,
   J. Alec. Lloyd.